US006322161B1

United States Patent
Maslonka et al.

(10) Patent No.: US 6,322,161 B1
(45) Date of Patent: Nov. 27, 2001

(54) APPARATUS AND METHODS FOR AUTOMATIC ENGAGEMENT AND LOCKING OF VEHICLE AIR PARKING BRAKE

(76) Inventors: Dale Maslonka, 17 Tara La., Horseshoe Bend, ID (US) 83629; G. David MacGregor; Noble Hamilton, both of P.O. Box 1290, Cascade, ID (US) 83611

(*) Notice: Subject to any disclaimer, the term of this patent is extended or adjusted under 35 U.S.C. 154(b) by 0 days.

(21) Appl. No.: 09/521,824

(22) Filed: Mar. 9, 2000

Related U.S. Application Data

(63) Continuation-in-part of application No. 09/108,863, filed on Jul. 1, 1998, now abandoned.

(51) Int. Cl.[7] .................................................... B60T 17/16
(52) U.S. Cl. .......................................... 303/89; 303/119.1
(58) Field of Search .............................. 303/119.1, 3, 6.1, 303/15, 19, 9.76, 89

(56) References Cited

U.S. PATENT DOCUMENTS

| | | | |
|---|---|---|---|
| 1,675,465 | 7/1928 | Roehrich | 70/127 |
| 3,000,459 | 9/1961 | Silver et al. | 180/82 |
| 3,174,502 | 3/1965 | Howarth et al. | 137/351 |

(List continued on next page.)

FOREIGN PATENT DOCUMENTS

| | | | |
|---|---|---|---|
| 43 42 543 A1 | 6/1995 | (DE) | A61G/3/04 |
| 2 265 679 A | 10/1993 | (GB) | B60R/25/08 |
| 2 205 620 A | 12/1988 | (GB) | B60T/17/16 |
| 2 340 902 | 3/2000 | (GB) | B60T/7/22 |
| 2 268 608 | 1/1994 | (GB) | G07C/5/08 |
| WO 98/16411 | 4/1998 | (WO) | B60R/25/04 |
| WO 86/04869 | 8/1986 | (WO) | B60T/13/66 |

OTHER PUBLICATIONS

Copy of Safety Systems and Controls, Inc. "Web Page" printed from Internet on Mar. 19, 2000.
Wiring Schematics of 1998 Thomas Bus from dealer's manual. Date of Publication unknown.

*Primary Examiner*—Christopher P. Schwartz
*Assistant Examiner*—C. T. Bartz
(74) *Attorney, Agent, or Firm*—Ken J. Pedersen; Barbara S. Pedersen

(57) ABSTRACT

The present invention is a safety-enhancing automatic air parking brake actuator system that automatically actuators the air brakes in an engaged condition when one or more dangerous conditions exist at various stations around/in the vehicle or equipment. The preferred actuator system operates on the principle that the brake actuator system is electrically connected to the various stations, and, when a circuit including the actuator unit is interrupted, a solenoid valve of the actuator system closes and vents, to cut off the air supply to the air brakes to engage the brakes. The stations may include the vehicle ignition, one or more doors, a wheelchair lift, a dump truck bed, a backhoe arm, or other equipment. By turning off the vehicle ignition switch, which ignition system is preferably the power source for the actuator unit, or by interrupting any of the various circuits to the various stations, the actuator unit will "trip," that is, the solenoid valve will close and vent air, thus, applying the brakes. The actuator system may be installed in an air brake system by placing the brake actuator unit in-line between the air source and the air brakes. The solenoid valve of the brake actuator unit has an exhaust vent which releases air-line pressure when the solenoid valve is de-energized by any one of the various brake actuator circuits being interrupted. The brake actuator unit may be installed adjacent to a conventional loading valve, or may be installed in the place of a conventional loading valve. In use, if the driver does not manually set the parking brake whenever there is an action about to take place that requires extra caution and care, the invented system sets the air brake for him/her.

9 Claims, 12 Drawing Sheets

U.S. PATENT DOCUMENTS

| | | | |
|---|---|---|---|
| 3,508,625 | 4/1970 | Hawkins | 180/114 |
| 3,579,285 | 5/1971 | Verdier | 307/10 |
| 3,937,295 | 2/1976 | Wright | 180/103 BF |
| 4,074,787 | 2/1978 | Cunningham et al. | 180/286 |
| 4,136,752 | 1/1979 | Friesen et al. | 180/101 |
| 4,200,167 | 4/1980 | Cockman, Jr. | 180/281 |
| 4,258,819 | 3/1981 | Baptiste, Sr. | 180/287 |
| 4,519,653 | 5/1985 | Smith | 303/89 |
| 4,721,192 | 1/1988 | Cano et al. | 188/353 |
| 4,779,433 | 10/1988 | Légaré | 70/211 |
| 4,812,777 | 3/1989 | Shirai | 303/14 |
| 4,824,178 | 4/1989 | Petersen | 303/15 |
| 4,838,617 | 6/1989 | Deitchman et al. | 202/6.1 |
| 4,864,298 | 9/1989 | Dombrowski | 340/904 |
| 4,934,492 | 6/1990 | Hayes-Sheen | 188/353 |
| 5,002,345 | 3/1991 | Becker | 303/119 |
| 5,036,961 | 8/1991 | Eberling et al. | 192/1.23 |
| 5,041,810 | 8/1991 | Gotanda | 340/426 |
| 5,085,061 | 2/1992 | Maudsley | 70/225 |
| 5,370,449 | 12/1994 | Edelen et al. | 303/3 |
| 5,505,528 | 4/1996 | Hamman et al. | 303/89 |
| 5,533,795 | 7/1996 | Brooks | 303/6.1 |
| 5,560,233 | 10/1996 | Watkins | 70/177 |
| 5,570,756 | 11/1996 | Hatcher | 188/353 |
| 5,584,538 | 12/1996 | Takasaki | 303/89 |
| 5,624,352 | 4/1997 | Smale | 477/197 |
| 5,675,190 | 10/1997 | Morita | 307/10.1 |
| 5,688,027 | 11/1997 | Johnson | 303/89 |
| 5,706,909 | 1/1998 | Bevins et al. | 180/273 |
| 5,839,304 | 11/1998 | Wills | 70/175 |
| 5,912,615 | 6/1999 | Kretzmar et al. | 340/426 |
| 5,934,768 | 8/1999 | Miyake | 303/122.09 |

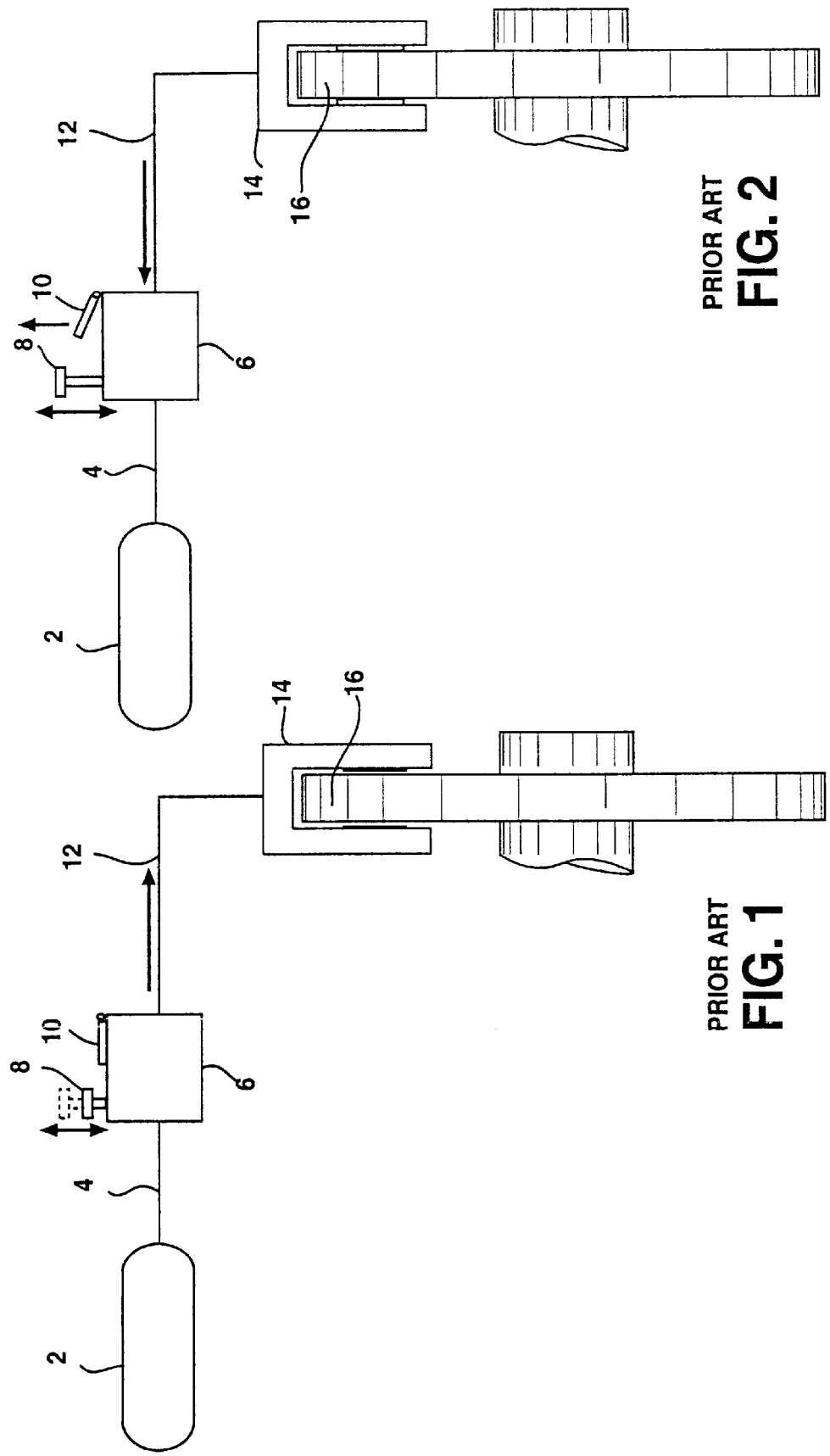

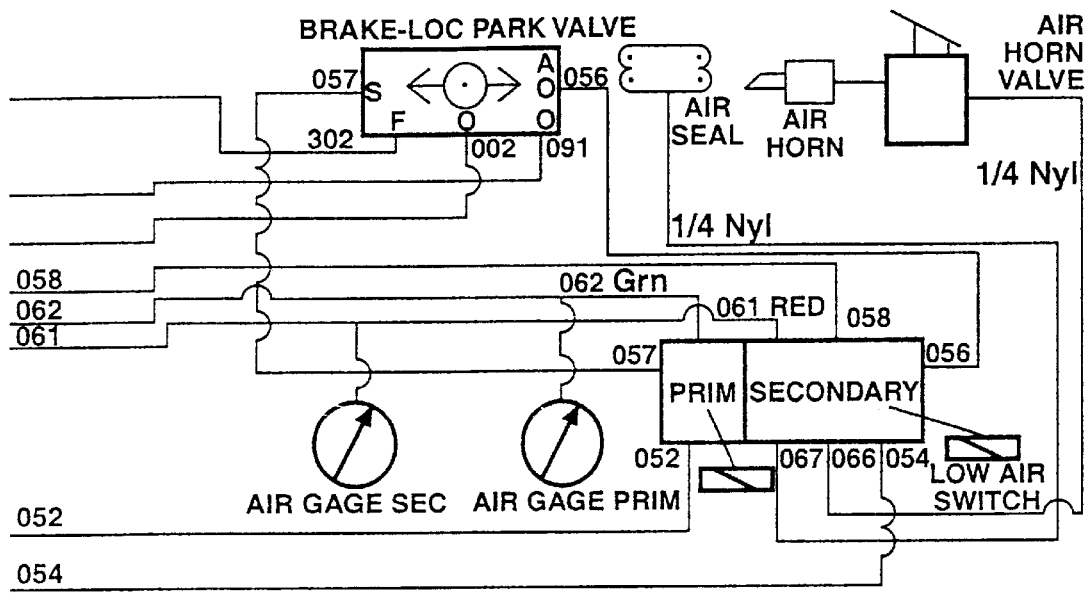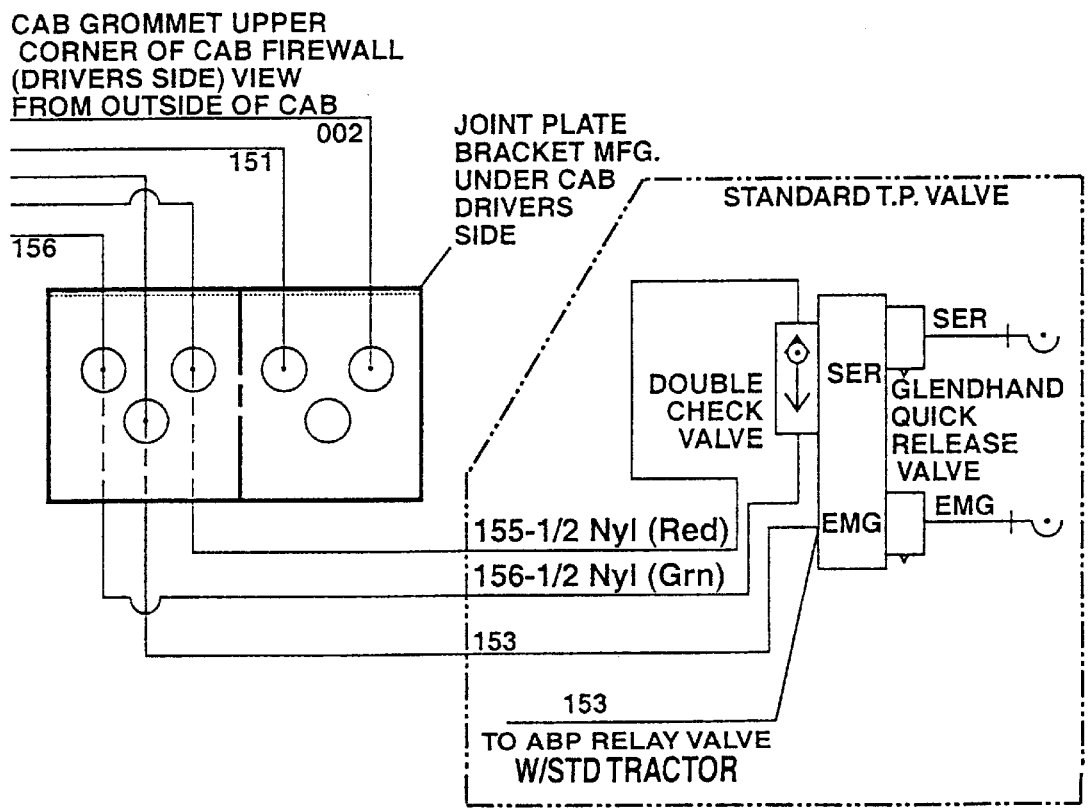
FIG. 12B

APPARATUS AND METHODS FOR AUTOMATIC ENGAGEMENT AND LOCKING OF VEHICLE AIR PARKING BRAKE

DESCRIPTION

This application is a continuation-in-part of prior, co-pending application Ser. No. 09/108,863, filed Jul. 1, 1998, and entitled "Automatic Air Parking Brake Lock," which application is herein incorporated by reference.

BACKGROUND OF THE INVENTION

1. Field of the Invention.

This invention generally relates to air parking brakes for vehicles. More particularly, this invention relates to a device for automatically "locking" an air parking brake in a safe, engaged condition during times when it is not safe for the vehicle to move. This automatic engagement and locking of the air parking brake may be actuated by signals from various circuits and sensors inside and outside the vehicle.

2. Related Art.

Numerous types of vehicles employ what is called an "air parking brake". Simply put, an air parking brake system is comprised of three main parts: an air source, a valve and the brake itself, which is a spring-actuated brake that is disengaged by air pressure acting against the spring(s). When the valve is open, called a loading valve, air is supplied to the brake, thereby releasing the brake and allowing movement of the wheels of the vehicle. When the valve is closed, air pressure is relieved from the brake through an exhaust vent and the spring engages the brake, thereby inhibiting movement of the wheels of the vehicle.

An example of such an air parking brake system exists in commonly used commercial vehicles, such as trucks, commercial buses, or school buses. In such vehicles, an air compressor compresses air, which is stored in a reservoir or tank. This air is then directed to a loading valve through a supply hose and on to the parking brake mechanism through a delivery hose. This loading valve has a handle that extends from the dashboard of the vehicle, allowing the vehicle operator to "Pull To Apply" or "Push To Release" the parking brake.

"Pulling" the loading valve handle closes the loading valve, cutting off the air pressure coming from the reservoir or tank. Air pressure in the delivery hose (between the loading valve and the parking brake) is released automatically through use of an exhaust vent built into the loading valve. When air pressure is absent from the air parking brake, brake springs hold the brake pads against the brake drum, thereby inhibiting the rotation of the vehicle's wheel (s).

"Pushing" the loading valve handle opens the loading valve, allowing air pressure to reach the air parking brake. When air pressure is applied to the air parking brake, the air pressure overcomes the tension of the brake springs holding the brake pads on the brake drum, and the air parking brake is released, allowing rotation of the wheel.

The inventor is aware of several conditions and events in and around a vehicle that create the potential for danger if the vehicle moves during the condition or event. The inventor is also aware that conventional safeguards against unwanted vehicle movement are less than optimum. For example, a conventional, engaged air parking brake may be accidentally released by someone accidentally bumping into the loading valve handle or otherwise inadvertently or intentionally pushing the loading valve handle. If this happens when the vehicle is parked on a hill, the vehicle may roll down the hill, causing the potential for injury/damage to passengers and to people and property in its path.

Another dangerous event occurs when a vehicle operator fails to set the parking brake before leaving the driving seat, with or without the vehicle engine running. By leaving the driving seat, he/she leaves the position from which he/she may quickly regain control of the vehicle if it begins to move at an inappropriate time. Therefore, because it is a manual system and vulnerable to operator error, the conventional air parking brake system is less than optimum, and can again result in injury to people and damage to property.

Other potentially dangerous conditions exist when people are entering or leaving a vehicle. For example, during use of a wheelchair lift, the individual in the wheelchair and any assistants near the lift are in risk of being injured if the vehicle moves suddenly or unexpectedly. Or, school children or adults are at risk when entering or leaving a bus, if the bus moves, either because the bus begins rolling down a hill or because the driver does not realize the individual is in or near the door. School children or adults are also at risk if an emergency door, for example, at the back of a school bus, is opened and the bus moves ahead.

There are instances of parking brake locking systems in the patent literature, but none are as simple, effective, and safe as that envisioned by the present inventor. None of the prior art locking systems include the comprehensive safety features of the present invention. None of the prior art devices feature the fail-safe systems of the present invention, which preferably override other signals, except for a vehicle movement sensor system, to apply the spring-actuated parking brake.

One patent shows an invention for keeping an air parking brake from being accidentally, inadvertently, or intentionally disengaged. U.S. Pat. No. 5,688,027 (Johnson) discloses a "control valve lock for a vehicle air brake system." Essentially, Johnson describes a box that locks over the top of the valve handle impeding the release of the parking break until the box is unlocked. A disadvantage of the Johnson invention is that the operator must take separate steps each time the brake is to be locked, through the use of the box and the additional key.

There are inventions for the automatic engagement of parking brakes upon the turning off of an ignition or engine key switch. U.S. Pat. No. 5,624,352 (Smale) discloses an "ignition-controlled parking brake interlock." This lever and latch interlock invention is activated by turning off the vehicle ignition key. U.S. Pat. No. 5,675,190 (Morita) discloses an "operating apparatus for parking brake and method for releasing parking brake." The Morita invention uses a combination of the vehicle ignition key switch, with ON-OFF positions, and a three-way parking brake switch with ON-OFF-RESET positions, to engage the parking brake. A drawback of the Morita invention is the complexity incumbent in the use of its multiple switches.

Some vehicle anti-theft devices are designed to prevent brake disengagement by unauthorized persons. U.S. Pat. No. 3,579,285 (Verdier) discloses such a system, entitled "hydraulic anti-theft system for vehicles." The Verdier invention comprises an additional key operated switch, other than the ignition switch, which works to maintain fluid in the brake lines and subsequently pressure on the brakes. A disadvantage of Verdier is the use of an additional key.

U.S. Pat. No. 4,519,653, issued to Smith, discloses an anti-theft lock device, which includes a solenoid for attachment to the outer end of a conventional loading valve. When de-energized, the solenoid moves a lock member into the path of the valve actuating member of the conventional loading valve, physically blocking the actuating member so that it cannot be pushed in to disengage the parking brake. If the conventional loading valve has been disengaged prior to de-energizing of the solenoid, then the solenoid and its lock member are ineffectual, in that the lock member merely slideably contacts the side of the valve actuating member in a non-interfering relationship, and, hence, does not engage the brake or have any effect on the brake. Thus, the Smith device may be used as an anti-theft device, after the driver has manually pulled on the brake and turned off the ignition, but it does not have the automatic emergency safety features of the present invention.

Another U.S. Patent, that issued to Howarth (U. S. Pat. No. 3,174,502), discloses a "theft prevention apparatus." This apparatus employs a ignition switch which, when closed, engages a hydraulic brake system.

While inventions exist for the control of brakes in general, none combine ease of use and simplicity of manufacture/ installation with both safety and theft deterrence. None include the automatic brake engagement and locking features that prevent dangerous movement during the everyday operation of many vehicles and make everyday operation safer for the vehicle drivers and the public.

SUMMARY OF THE INVENTION

The present invention is an automatic air parking brake actuator system that allows the operator to safely secure a vehicle employing air parking brakes in a way that eliminates accidental and inadvertent disengagement of the air parking brake, for example, by a passenger or a prankster. The present invention further may include automatic systems for placing and maintaining the parking brake in an engaged position when potentially dangerous conditions exist. Such potentially dangerous conditions may include: an operator exiting the vehicle without applying the parking brake or without turning off the vehicle; or operating a disabled person's lift; passengers entering and exiting the vehicle. The preferred brake actuator system operates on the principle that when a circuit including the actuator unit is interrupted (either the positive side or the negative (ground) side) the solenoid valve closes and vents, to cut off the air supply to the brakes to engage the brakes. Thus, by turning off the ignition switch or by interrupting any of the various circuits to the various stations (by "opening of switches" which herein means opening a switch or interrupting a circuit either on the positive or ground side) the actuator unit will "trip," that is, the solenoid valve will close and vent, thereby allowing the brake spring(s) to engage the brakes. The present invention has application in the many vehicles that employ air parking brakes, for example, school buses and other commercial passenger buses or tractor-truck combinations.

The invented brake actuator system therefore includes one or more automatic features, in which a valve system: 1) cuts off the air supply and/or vents the air to the air parking brake to "engage" or "set" the brake; and/or 2) maintains ("locks") the air parking brake in the engaged condition, until the brake is manually disengaged by the driver after the potentially unsafe condition is terminated. The invented brake actuator may be actuated by one or more automatic sensors which sense conditions of one or more "stations" in or around the vehicle (or trailer, equipment, or component) that are potentially dangerous if the vehicle moves. Such "stations" may be vehicle components in or around the vehicle, or even other equipment of locations distanced from the vehicle, for example, on a loading dock or warehouse. Such "stations" may include the ignition switch, the vehicle main door and/or an emergency door, or the wheelchair lift, or any other vehicle or trailer equipment. The automatic systems may be adapted to sense particular equipment positions or sense people or moving objects in positions of danger. In the preferred automatic mode of operation, movement of equipment or conditions at stations that correspond to dangerous conditions signal the brake actuator system, typically by breaking electrical circuits that include the brake actuator system. Such "signals" to the actuator unit cut off and vent air to the air brakes, thus allowing the brake springs to set the parking brakes. For example, one such automatic system comprises the brake actuator being electrically connected to the vehicle ignition key switch, so that the actuating of the air parking brake becomes automatic upon turning the ignition to "OFF" (open circuit) position. Other automatic systems comprise the brake actuator being electrically connected to a switch/sensor operatively connected to the handicapped lift system, so that use of the lift indirectly or indirectly breaks a circuit and trips the actuator unit to shut off air to the brakes. Another automatic system comprises the brake actuator being electrically connected to the door of a vehicle, so that opening of the door breaks its sensor circuit and trips the actuator unit to shut off air to the brakes, either immediately or after a pre-set desired delay time, or as long as the vehicle is not in motion. Many other stations may be selected for connection to the brake actuator system, for example, dump truck beds, doors on delivery vehicles, and any equipment in, around, or near a vehicle that uses an air-spring brake system.

The major benefits of the present invention are greatly increased safety and theft deterrence, with the objective of a new, higher standard of safety and security. By linking the ignition system and linking sensors of equipment in, around, or outside the vehicle, to the parking system, the invented system greatly decreases the chance of theft, vehicle highjacking, and personal injury. By actuating the air parking brake to prevent disengagement, and/or by automatically engaging and actuating the parking brake in potentially unsafe situations, it is less likely that a vehicle, or equipment, or component, will move due to accidental and/or incidental release of the parking brake and it is less likely that the vehicle/equipment/component will move when passengers or operators are in a dangerous locations.

The automatic systems of the invented brake actuator are vital to safe operation of many vehicles, because of the busy, varied, and often stressful tasks that a vehicle operator must perform. For example, a driver of a bus or other passenger vehicle is often out of the parked vehicle helping to load or unload the vehicle, and it is important to increase the automatic safety features that protect the driver and the passengers with whom he is working. The invented brake actuator system is generally constructed under the assumption that the vehicle should not move when the ignition key switch is in the open or "OFF" position, when the driver is outside the vehicle, and should not move when an individual is entering, exiting, or very near the vehicle. Also, the invented brake actuator system helps prevent unauthorized persons from moving the vehicle because the preferred brake actuator system operatively connects the disengagement of the air parking brake to turning the vehicle's ignition key switch into the closed circuit or "ON" position.

The actuator system comprises an air supply block valve and a vent for the air downstream of the air supply block valve, which are installed in a conventional air parking brake system, preferably as a replacement of, or optionally in addition to, the conventional loading valve. A retrofit brake actuator system may be installed either upstream or downstream of the conventional air brake loading valve. Or, as on the preferred embodiment, the invented actuator system is incorporated into the vehicle/equipment, during initial manufacture, in the form of a single valve system that replaces the conventional loading valve and is adapted to electronically cooperate with the ignition switch and other stations. The block and vent are preferably accomplished by a single valving mechanism, such as a solenoid valve, but they may alternatively be designed to be separate, cooperating valves.

The present invention, unlike prior systems, is easy to use and install. There is no need for additional actuators (Johnson, Verdier), or additional switches (Morita) in order to actuator the air parking brake. There is no need to attach a device to the body of the conventional loading valve, but rather the conventional valve is preferably replaced with the invented system that electronically controls the brake system for optimized safety. There is preferably no physical/mechanical blocking member that interferes with operation of a conventional loading valve actuator, but, rather, 1) either a brake actuator valve according to the invention upstream or downstream from the conventional loading valve, or 2) the preferred electronically-controlled actuator system, according to the invention, in the air line in place of the conventional loading valve. The applicant envisions that the present invention preferably be installed during manufacture of buses, passenger vans, tractor-trailers, dump trucks and other heavy equipment, and other vehicles, but it may also be packaged as a modular retrofit unit for later installation.

While the inventor prefers that the invented brake actuator system is signaled by the various stations by means of circuits being broken (either on the positive side powering the solenoid or the negative ground side), and, subsequently, power to the solenoid being cut, other means of signaling the brake actuator system may be included in the invention.

BRIEF DESCRIPTION OF THE DRAWINGS

FIG. 1 is a schematic diagram of one embodiment of the prior art showing an air parking brake system including: an air source, a conventional air parking brake mechanism, and a conventional loading valve with the manual dashboard handle in the "pushed-in" position to disengage the brake.

FIG. 2 is a schematic of the prior art embodiment of FIG. 1, showing the loading valve closed, by pulling out the manual handle, which cuts the air pressure supply coming from the air source, and opens the loading valve's exhaust vent to vent air pressure remaining in the air hose between the loading valve to the air parking brake mechanism, thereby engaging the air parking brake.

FIG. 3 is shown with the loading valve handle pushed in and the ignition switch closed to energize the solenoid valve, whereby air is allowed to pass through both the solenoid valve and the loading valve to disengage the brake.

FIGS. 12A and 12B are halves of a schematic diagram, illustrating one method of installation of the solid-state embodiment of the invention, wherein the schematic diagram is split between two sheets for ease of reading.

DESCRIPTION OF THE PREFERRED EMBODIMENTS

Figure 3:
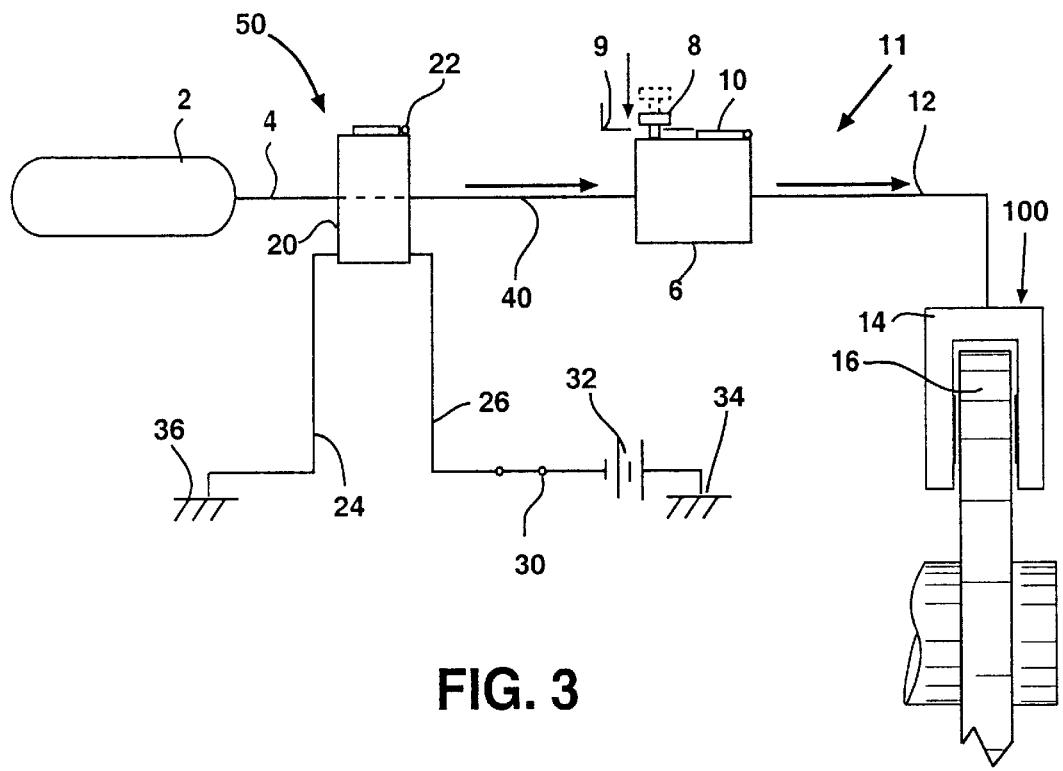
FIG. 3 is a schematic diagram of one embodiment of the present invention showing an air parking brake system including: an air source, a solenoid valve electrically connected to the vehicle ignition circuit, a conventional loading valve, and an air parking brake mechanism.

FIG. 1 and FIG. 2 depict one embodiment of the prior art, which is the conventional apparatus and method currently used in commercial vehicles, such as school buses, for air parking brakes. FIGS. 3–6 illustrates embodiments and placement of a solenoid system according to one group of embodiments of the invention, which are installed upstream or downstream of a conventional loading valve in an air parking brake line. FIGS. 7–12, depict several, but not the only, embodiments of the invented automatic air parking brake system, which changes a conventional parking system into a multi-use safety system.

In the prior art in FIG. 1, an air source 2 such as an air reservoir or air compressor supplies air pressure to the air parking brake system. This air pressure is conventionally used for the vehicle's air parking brakes, as well as the vehicle's air brakes in general. This air pressure is then routed through a supply air hose 4 to a loading valve 6. A delivery air hose 12 routes the air pressure from the loading valve 6 to the air parking brake mechanism 100. The loading valve 6 has an attached valve handle 8 which is mounted on the dash of the vehicle. When the valve handle 8 is "pushed" by the vehicle's operator into an inner position, the loading valve 6 is open. When the loading valve 6 is open, as in FIG. 1, air is allowed to pass through the supply air hose 4, through the open loading valve 6, through the delivery air hose 12, and into the air parking brake mechanism 100. Air pressure thus supplied to the air parking brake mechanism 100 overcomes the brake spring tension which holds the air parking brake pads 14 against the brake drum 16, thereby inhibiting movement of the vehicle's wheel(s). This release of the brake spring tension disengages the air parking brake mechanism 100 and allows for free movement of the vehicle's wheel(s).

In the prior art, when the valve handle 8 is "pulled" by the vehicle's operator into an outer position, the loading valve 6 is closed. When the loading valve 6 is closed, as in FIG. 2, the air source 2 is cut off and air pressure in the delivery air hose 12 and the air parking brake mechanism 100 is vented through an exhaust vent 10 located on the loading valve 6. This release of air pressure from the air parking brake mechanism 100 allows the brake springs located within the air parking brake mechanism 100 to retract. This forces the air parking brake pads 14 to press against the brake drum 16, thereby engaging the air parking brake mechanism 100 and inhibiting movement of the vehicle's wheel(s).

One embodiment of the invented automatic air parking brake system 11, in FIGS. 3–6, features a blocking and venting valve that is added to a conventional air brake system, as a supplement to the conventional loading valve, and is used to automatically engage the air parking brake of a vehicle upon the turning of the ignition key switch of the vehicle to the open circuit or "OFF" position by the vehicle operator. In the invented parking brake system 11 of FIGS. 3, 4A, 5, and 6, an air source 2, such as an air reservoir or air compressor supplies air pressure to the invented air parking brake actuator system 50. The air is routed from the air source 2 through a supply air hose 4 to a solenoid valve 20. A middle air hose 40 connects the solenoid valve 20 to a loading valve 6. The loading valve is then connected to the air parking brake mechanism 100 through the use of a delivery air hose 12. The solenoid valve 20 is electrically grounded through the use of a ground wire 24 in contact with a ground screw 36. The solenoid valve 20 is electrically connected to the vehicle's ignition key switch 30 through the use of a connection wire 26. When the vehicle's ignition key switch 30 is closed or "ON", then the solenoid valve 20 is energized, actuating the solenoid valve 20 to an "open" position. When the vehicle's ignition key switch 30 is open or "OFF", then the solenoid valve 20 is de-energized, making the solenoid valve 20 "closed." The vehicle's ignition key switch 30 is ultimately connected to the vehicle's battery 32, which itself is grounded 34.

FIG. 3 shows automatic air parking brake system 11 during normal driving with the parking brake off. The ignition key switch 30 is closed or "ON", thereby energizing and opening the solenoid valve 20. The manual parking brake handle 8 is pushed into an inner position on the dashboard 9, so that the loading valve is open. When in this configuration, air pressure is allowed to travel from the air source 2, through the supply air hose 4, through the open solenoid valve 20, through the middle air hose 40, through the open loading valve 6, through the delivery air hose 12, and to the air parking brake mechanism 100. Within the air parking brake mechanism, this air pressure overcomes the brake spring tension biasing the air parking brake pads 14 towards the brake drum 16. Thus moving the pads 14 away from the brake drum 16 results in "disengagement" of the air parking brake, thereby allowing for free movement of the vehicle's wheel(s).

Figure 4A:
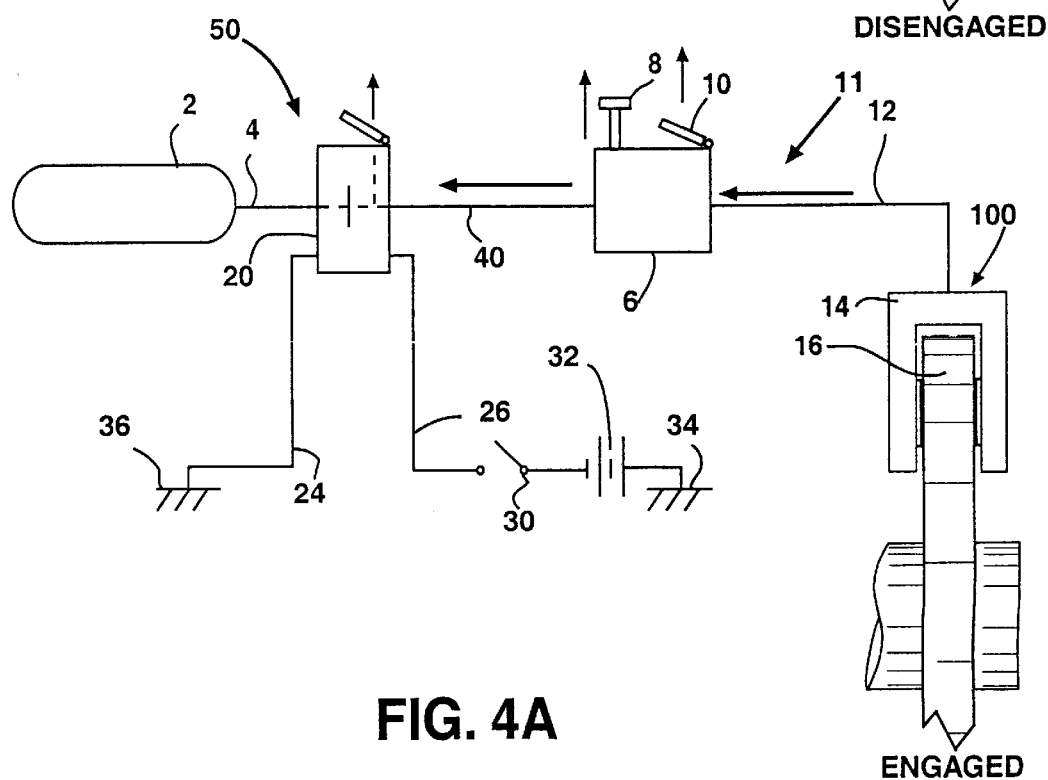
FIG. 4A is a schematic diagram of the embodiment of FIG. 3, shown with the ignition switch open, the solenoid valve closed, and the loading valve closed (manual dashboard handle pulled out), which conditions sever the air pressure supply coming from the air source, vent the air pressure remaining in the middle air hose through the solenoid valves's exhaust vent, and vent the pressure in the delivery hose (running from the loading valve to the air parking brake mechanism) through the loading valve vent, thereby engaging the parking brake.

FIG. 4A shows automatic air parking brake system 11 with its actuator system 50 when the vehicle's ignition key switch 30 is open or "OFF", thereby de-energizing and closing the solenoid valve 20. When in this configuration, air pressure within the solenoid valve 20 and within the middle air hose 40 is vented through the solenoid valve exhaust vent 22. Air pressure within the loading valve 6, within the delivery air hose 12, and within the air parking brake mechanism 100 is vented through the loading valve exhaust vent 10 of the closed loading valve 6. This release of air pressure allows the brake mechanism 100 to "engage", that is, allowing the brake springs 15 to retract, thereby bringing and holding the brake pads 14 into contact with the brake drum 16 and inhibiting movement of the vehicle's wheel(s).

In FIG. 4A, the manual handle 8 is shown in the "pulled" outer position, and the loading valve is closed. This loading valve position may result from either of two cases. If the vehicle operator pulls the handle 8 before turning off the ignition switch, the loading valve closes and vents. Or, if the ignition switch is turned off first, the solenoid valve 20 lowers the pressure directly upstream (in middle hose 40) of the loading valve, and this lowering of pressure automatically "pops" or closes the loading valve. This is due to the loading valve being designed to be fail-safe by releasing pressure on the brake springs and thereby engaging the parking brake in the event of an air source failure. Depending on the particular design, the loading valves are designed to automatically close when upstream pressure drops below about 60 psi, for example.

Figure 4B:
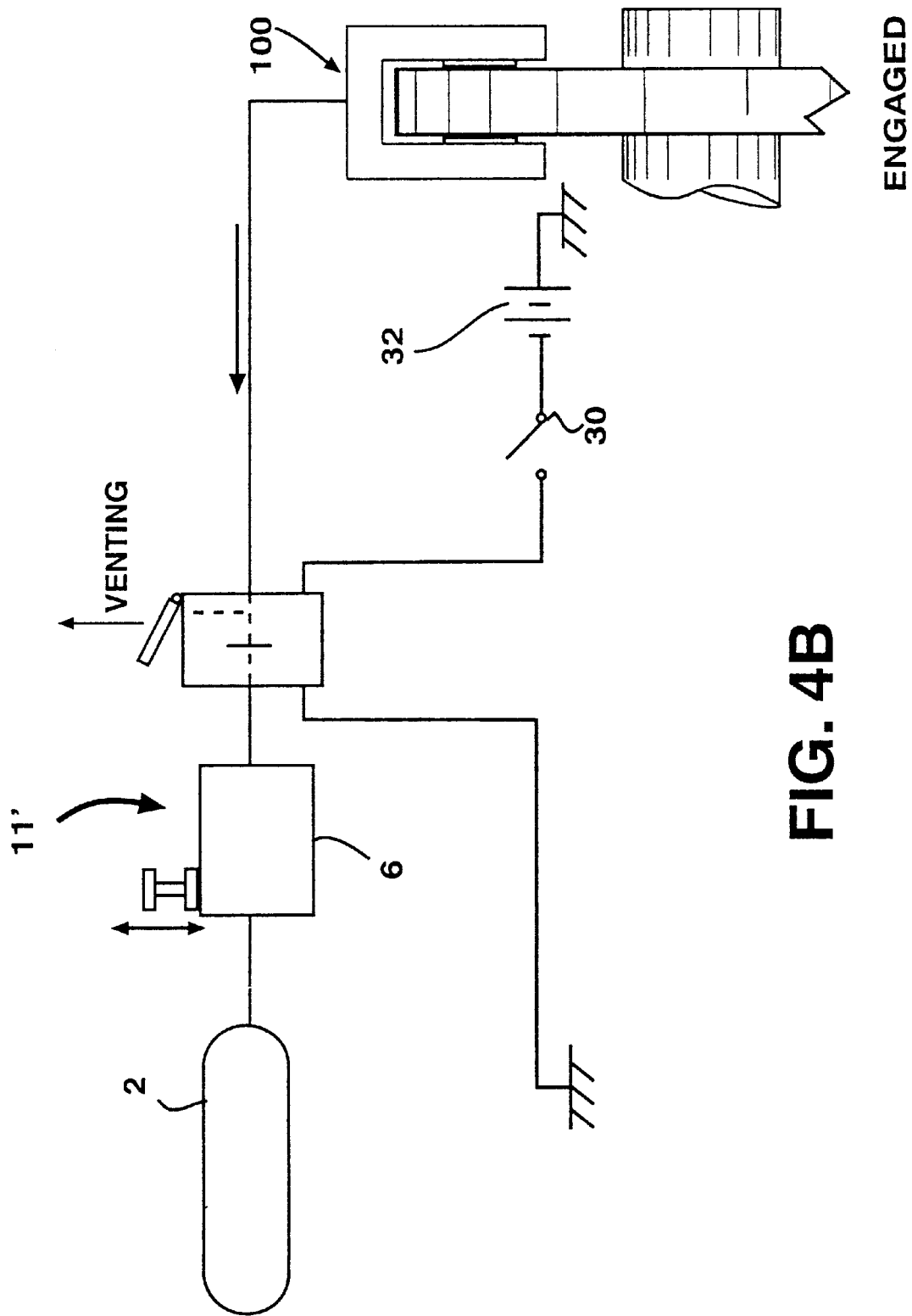
FIG. 4B is a schematic diagram of an alternative embodiment of the present invention, wherein the solenoid valve, which is electrically connected to the vehicle ignition circuit, is positioned between the conventional loading valve and the brake. In this Figure, the ignition switch is open, which opens and vents the solenoid valve to engage the brake, even if the conventional loading valve is open.
Figure 5:
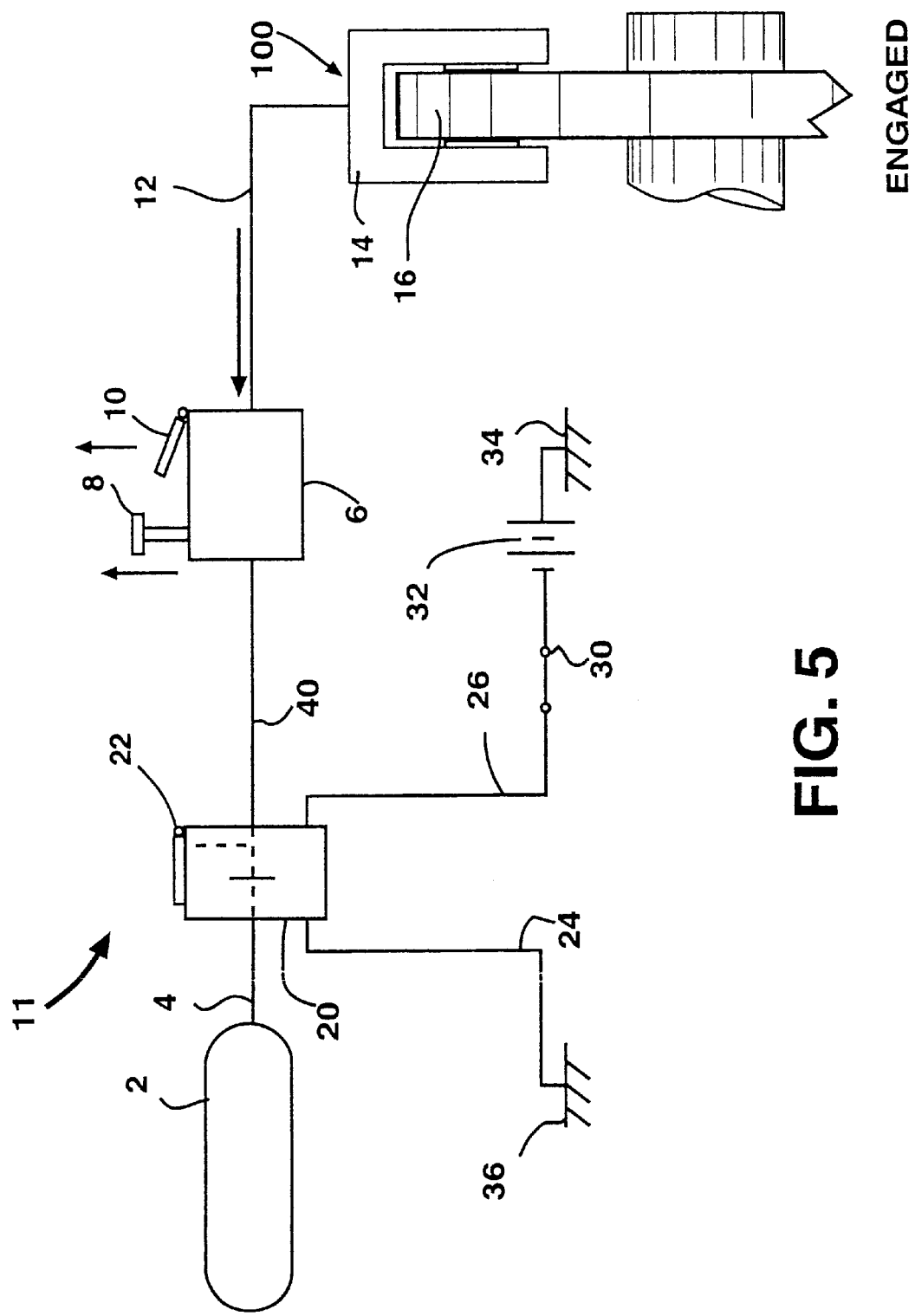
FIG. 5 is a schematic diagram of the embodiment of FIGS. 3 and 4A, showing the ignition switch closed, solenoid valve open, and the loading valve closed. These conditions sever the air pressure supply to the loading valve, and cause the air pressure remaining in the delivery hose to the brake mechanism to vent through the loading valve's exhaust, vent, thereby engaging the parking brake.

FIG. 5 shows automatic air parking brake system 11 when the vehicle's ignition key switch 30 is closed or "on", so that the engine is running, but the parking brake is engaged. The solenoid valve 20 is energized and open, pressurizing middle hose 40. The loading valve is closed, with the handle 8 in the "pulled" position. When in this configuration, air pressure within the loading valve 6, within the delivery air hose 12 and within the air parking brake mechanism 100 is vented through the loading valve exhaust vent 10. This release of air pressure engages the brake mechanism 100. In FIG. 5, the position of the loading valve may be for two reasons, both of which result in the safe condition of brake engagement. First, FIG. 5 may represent the situation in which the vehicle has been restarted after being parked and turned off, and the engaged parking brake has not yet been released by pushing in the handle 8. Also, FIG. 5 may represent the situation in which the operator is parked and idling the engine, but has purposely applied the parking brake by pulling out the handle 8. In either case, if the operator turns off the ignition switch, the actuator system will go into the mode shown in FIG. 4, in which the solenoid valve 20 maintains a low pressure upstream of the loading valve and maintains it in a closed position.

In the alternative embodiment automatic air parking brake system 11' shown in FIG. 4B, the delivery hose is cut, and the solenoid valve 20 is inserted between the conventional loading valve and the brakes. As in the embodiment of FIGS. 3 and 4A, this embodiment also places the solenoid valve adjacent to, and in series with, the loading valve and connects it to the ignition switch, so that the solenoid valve 20 serves to block air to the brakes when the engine is not running.

Use of system 11, 11', therefore, allows the vehicle operator to automatically "actuator" the parking break by turning the ignition key switch 30 of the vehicle to the open or "OFF" position. Being "actuated" means that, no matter what position the parking brake manual handle is in, the vehicle's air parking brake cannot be disengaged until the ignition key switch 30 is moved out of the "OFF" position. For example, the operator stops the vehicle, parks the vehicle on a hill and engages the air parking brake. When the operator turns the ignition key switch 30 to the "OFF" position, the air parking brake mechanism 100 will not be able to be disengaged until the ignition key switch 30 is moved again to the "ON" position. Therefore, while the key is in the "OFF" position, the air parking brake mechanism 100 will not be able to be accidentally and/or incidentally released by the "pushing" of the loading valve handle 8. If someone falls against the handle or a child or person pushes the handle, the situation is still safe. If, on the other hand, the operator parks the vehicle and turns off the ignition, but does not pull the parking brake, the system 11, 11' will automatically engage the parking brake, as in FIGS. 4A and B. The parking brake will remain engaged until the ignition switch is turned on and the handle 8 is pushed in.

Figure 6:
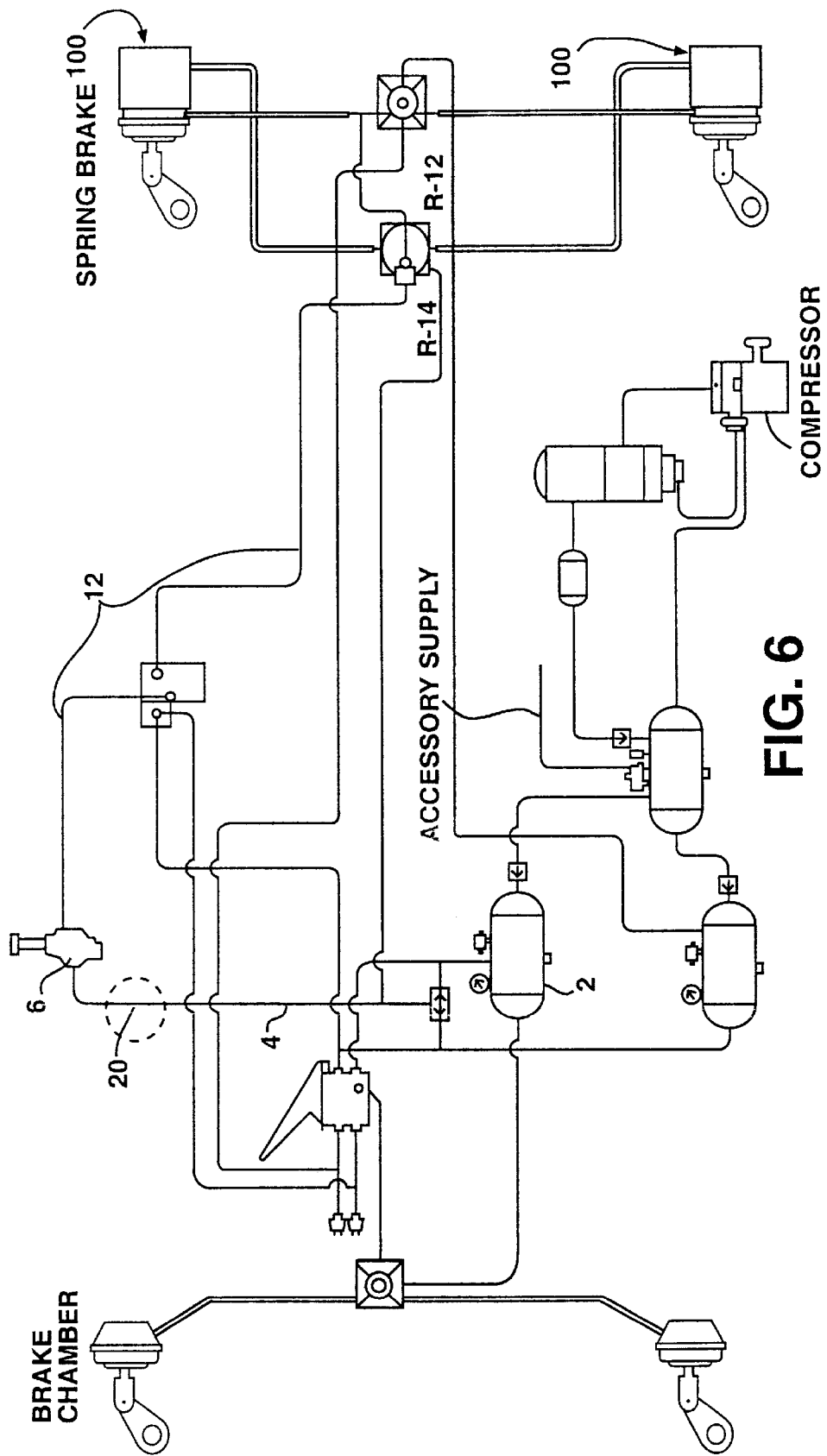
FIG. 6 is commercial vehicle brake system, indicating the location for installation of the embodiment of FIGS. 3, 4A, and 5.

Embodiments such as shown in FIGS. 3–5, which add a blocking and vent valve to conventional air parking systems, are well adapted to be retrofit into the air brake system of an existing commercial vehicle, for example, those which have a brake diagram similar to that shown in FIG. 6. The location for insertion of the actuator system solenoid valve 20 into the conventional parking brake system is marked in FIG. 6 with dashed lines. Such a system 11 does not disrupt or lower the integrity of the main (driving) brake system, as it is installed in lines separate from the main system.

Figure 7:
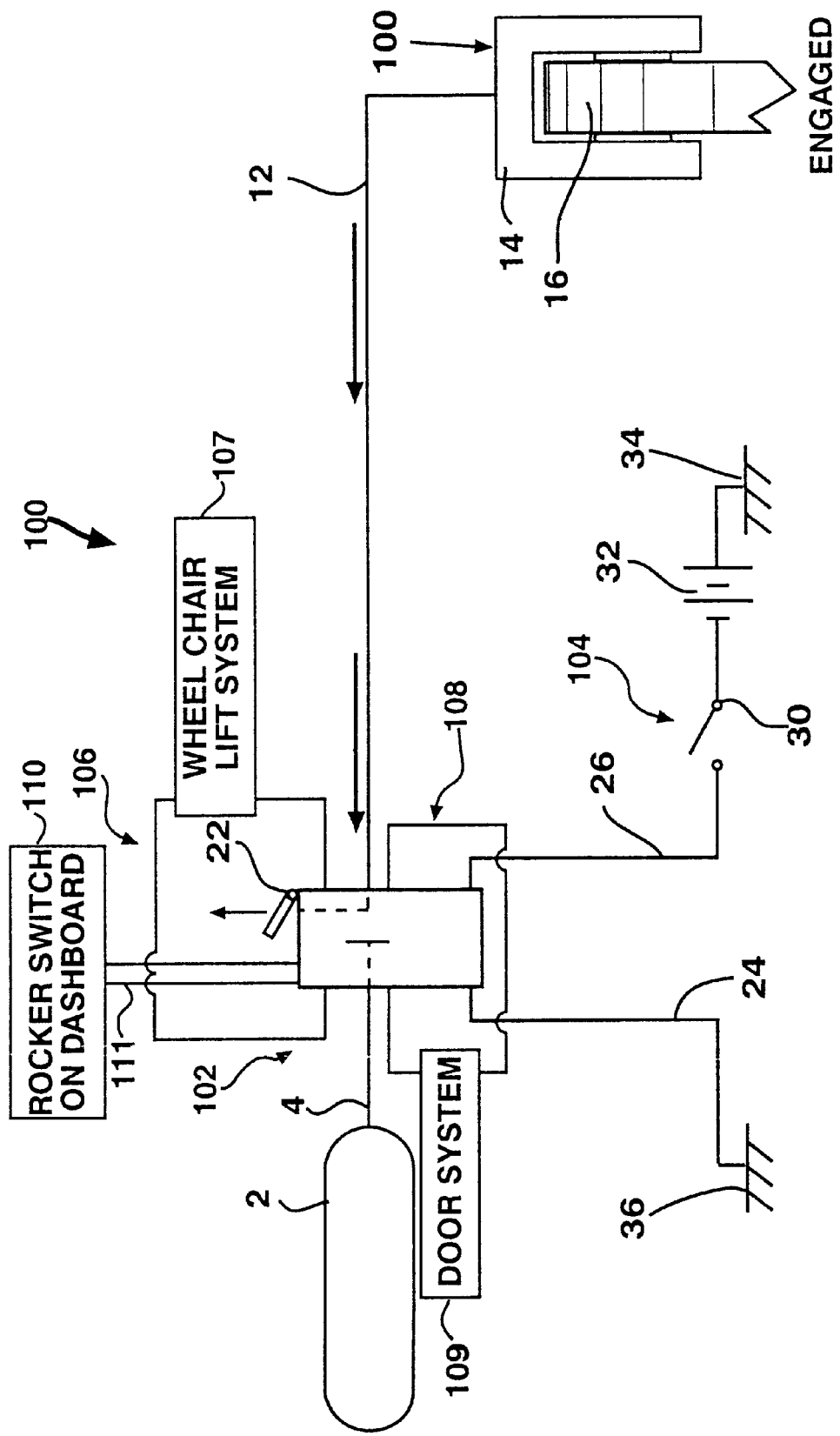
FIG. 7 is a schematic diagram of the preferred embodiment of the invention, including an automatically controlled actuator unit replacing a conventional loading valve and electronically connected to a plurality of stations on/around the vehicle.
Figure 8:
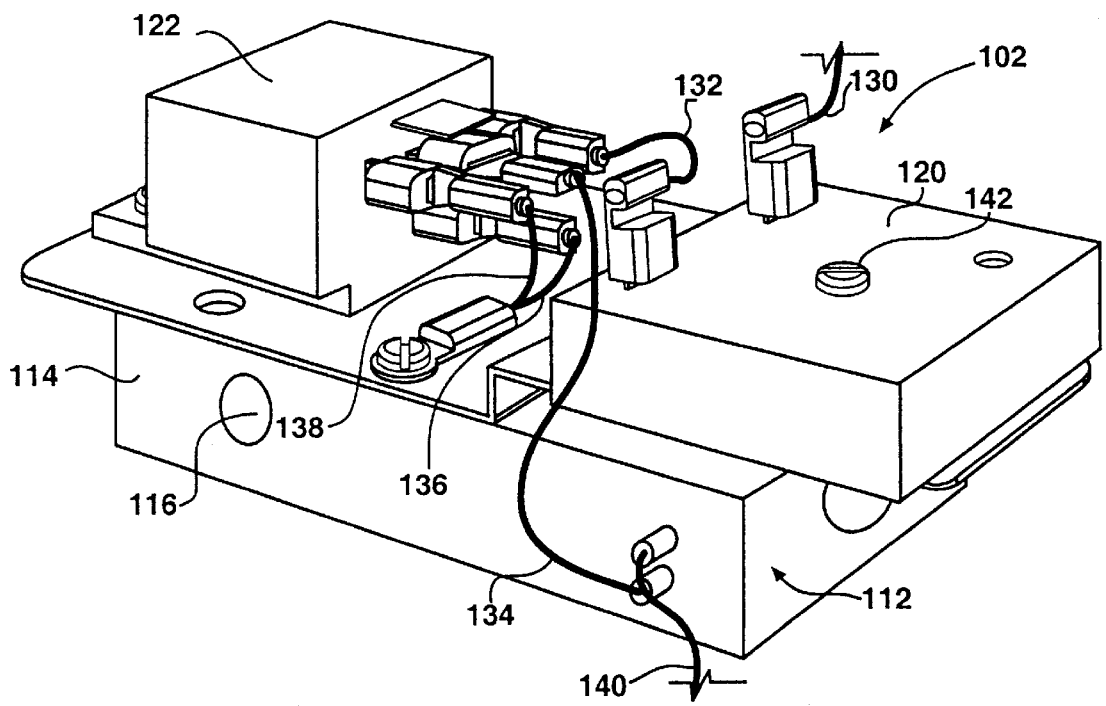
FIG. 8 is a perspective view of the preferred actuator unit of FIG. 7, for installation in a vehicle wherein the switch indicating whether the door is open or closed in on the positive side of the circuitry.
Figure 9:
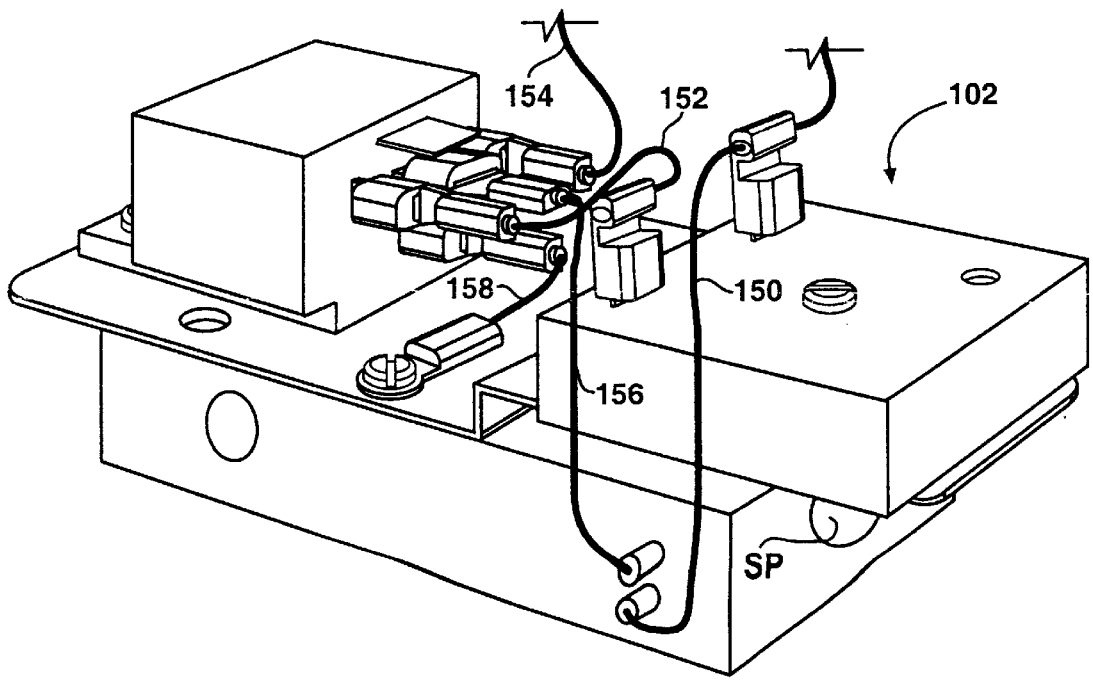
FIG. 9 is a perspective view of the preferred actuator unit of FIG. 7, for installation in a vehicle wherein the switch indicating whether the door is open or closed in on the negative side of the circuitry.
Figure 10:
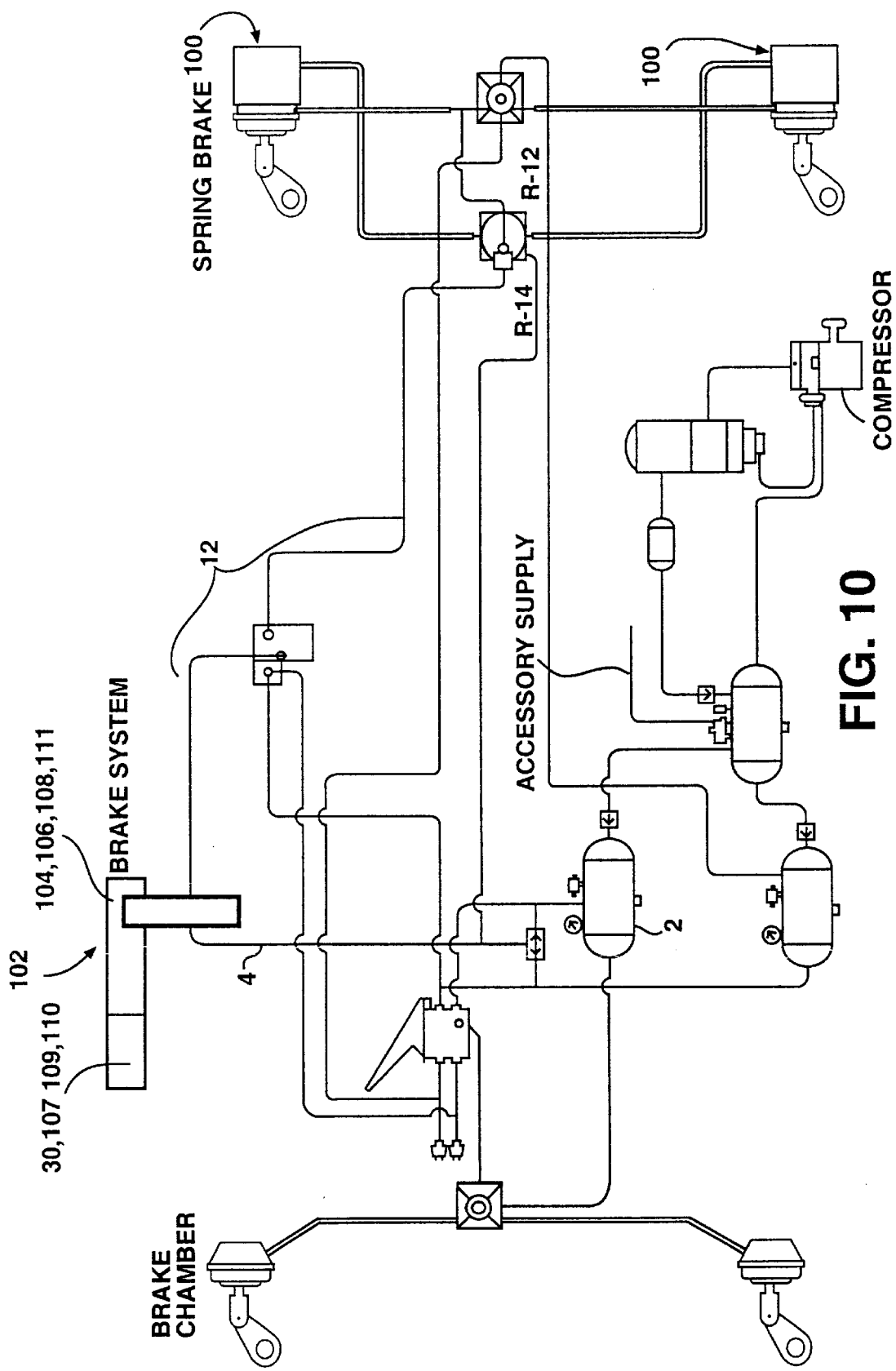
FIG. 10 is a schematic diagram of commercial vehicle air brake system, indicating the location for installation of the embodiment of FIGS. 7–9.
Figure 11:
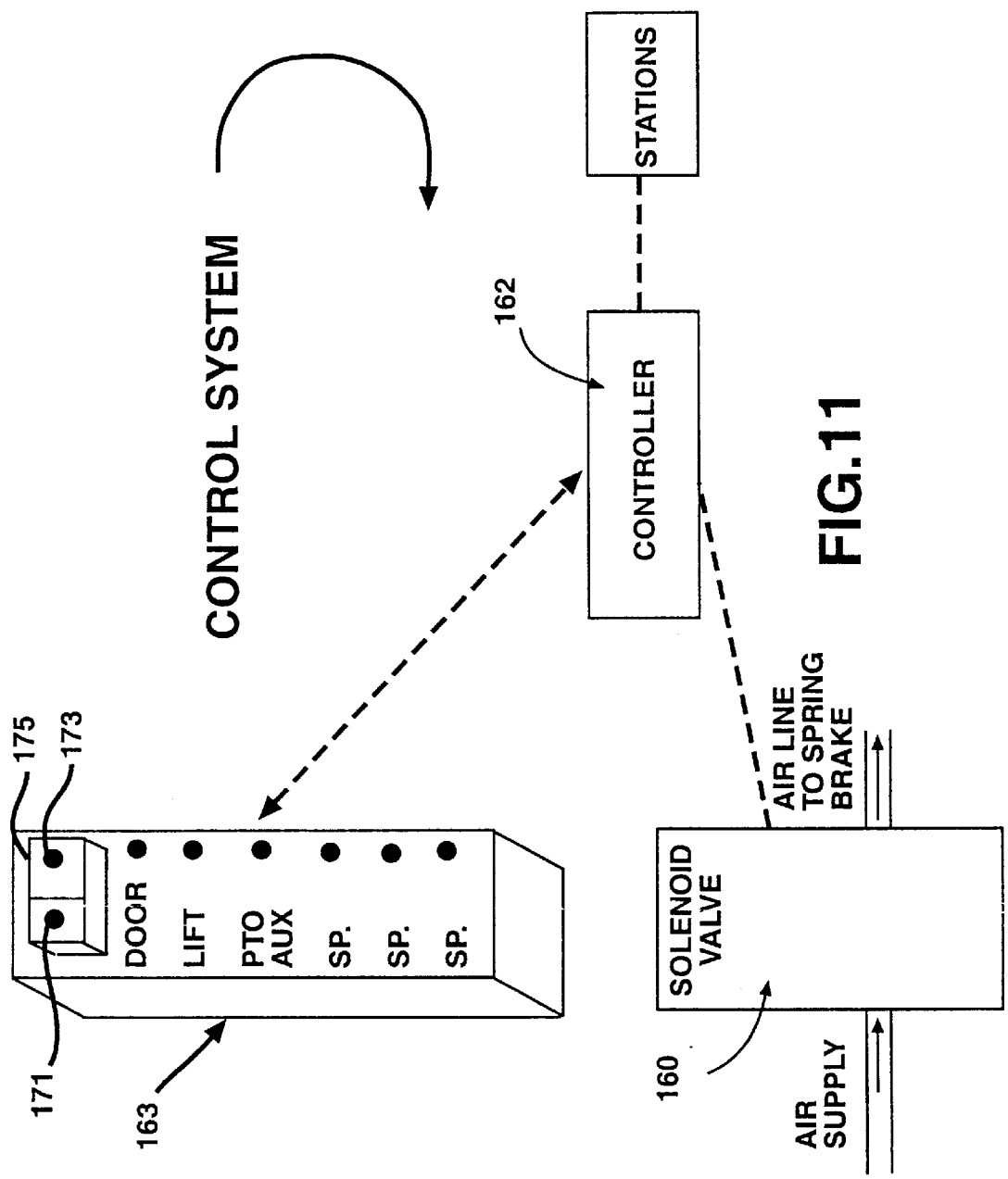
FIG. 11 is a schematic view of one embodiment of a solid-state brake actuator system according to the invention.

An especially-preferred embodiment of the invented brake actuator system is shown in FIGS. 7–9, in which the actuator system is operatively connected to other stations in/around the vehicle, in addition to the ignition switch, to prevent movement of the vehicle during situations at the various stations that would be dangerous is the vehicle moved. This especially-preferred brake actuator system 100 includes a solenoid-type valve unit 102 that replaces the conventional loading valve and that includes both blocking valve (inside housing, not shown) and vent. Preferably, as represented schematically in FIG. 7, the actuator system 100 includes a circuit 104 that cooperates with the ignition switch 30 generally as described above for actuator system 11, 11', a circuit 106 that cooperates with the wheelchair lift 107 so that the parking brakes will automatically be engaged when the lift is used, and a circuit 108 that cooperates with the passenger and/or driver door 109 so that the parking brakes will automatically be engaged when the door or any of a plurality of doors opens. The door switch for this station circuit is located at or near the door, and is preferably the same switch that is conventionally installed on the door for connection to the dome light. In the case of the wheel chair lift, a circuit is routed between the brake actuator unit and the lift, with a switch located at an appropriate position in/near the lift equipment to sense the lift being in any but its stowed, unused position.

Preferably, the system 100 also includes an on/off rocker switch 110 mounted on the dashboard or other convenient control center location in/on the vehicle, such as a rocker switch, that allows the driver to manually set the parking brake to a "park" position and to manually release the parking brake to a "drive" position. Such a switch 110, in effect, replaces the manual push/pull handle in conventional vehicle cabs, and may include lighting or flashing options to remind the driver of the status of the brake actuator system, for example, that the brake is set.

FIG. 8 illustrates one embodiment of the actuator unit 102 of the actuator system 100. The actuator unit 102 includes a solenoid valve 112 with an air blocking valve that is open and a vent that is closed, when the circuits to the ignition and to each station are closed. The actuator unit includes a body 114 with an air inlet port (on hidden side of body 114 in FIG. 8), an air outlet port 116, a vent port (on hidden side of body 114 in FIG. 8) and internal passages cooperating with the solenoid-actuated internal valving. The actuator unit 102 includes a timer 120 and a relay 122 electronically communicating with solenoid valve 112. Wires are shown schematically on FIG. 8, as follows, for a actuator unit 102 installed in a bus wherein the door switch is on the positive side of the circuitry: 130 wire from door switch; 132 wire from timer to relay; 134 wire from relay to solenoid ground; 136 wire to ground; 138 wire to ground; and 140 wire from ignition switch. In this embodiment, the timer may be preset by means of an adjustor 142 with a delay time, so that, once the is opened and remains opened more that the present delay time, a signal is sent to the relay and, hence, to the solenoid so that the solenoid blocks the air supply and vents air pressure from the line to the brake. Such a timer system may be used to prevent unwanted setting of the brakes when the door is opened only for a few seconds, for example, when the door is opened briefly to more properly seal it against weather, or to let out a bee, etc. The predetermined delay time is set, preferably at the factory, as an amount of time the door must remain open before the actuator system is actuated. This delay time is typically set in the range of 0.5–10 seconds, but may be set at zero time or at higher amount of time. Most preferably at 4–5 seconds for city busses and 0.5–1 seconds for school buses, so that a quick opening and closing of the door does not trigger the system. Alternatively, rather than supplying a timer, a motion or other sensor may be used to signal the system to prevent the setting of the brakes at any time when the vehicle is in motion over a particular speed, for example, 3 miles/hr, and, more preferably, over 1–2 miles/per hour. A preferred motion sensing system measures the rpm of the drive shaft exiting the transmission, and feeds that information to the controller. In this embodiment, the driver may control the solenoid valve from the driver's cab with rocker switch 110 and its circuit 112 which moves between solenoid valve open and solenoid valve closed positions.

In FIG. 9, the actuator unit 102 comprises the same elements as the actuator unit 102 of FIG. 8, except that it is wired to cooperate with bus wiring in which the door is on the negative side of the circuitry. This schematically-shown wiring may be described as follows: 150 wire from ignition to timer and to solenoid; 152 exciter wire from timer to relay; 154 door switch wire; 156 ground wire from solenoid to relay; and 158 ground wire. The embodiment of FIG. 9 operates generally the same as the embodiment of FIG. 8, except, as may be understood by one skilled in the art, the wiring is altered dependent on the wiring of the vehicle into which it is installed.

Thus, with the embodiments of FIGS. 8 and 9, there must be at least two conditions met to allow the solenoid to supply air to the brakes, that is, the ignition must be "on" and the door must be closed. If other stations are operatively connected to the actuator unit, more than these two conditions must be satisfied to supply air to disengage the brakes. FIG.

10 is a schematic diagram of a commercial vehicle brake system, indicating the location for installation of the embodiment of FIGS. 7–9.

Additional features may be included in the invented brake actuator system to increase safety and operability. In order to prevent an accidental engagement of the parking brakes when the driver or other party turns on the dome light, which is normally connected to the door switch to turn the dome light on when the door opens, a diode should be installed in the line between the dome light and the door switch. This way, the actuator system is wired so that turning on the vehicle dome light does not trip the brake actuator in the same way that opening the door does. An air pressure failsafe system is preferably also included in the invented brake actuator system for each vehicle or trailer. When air supply pressure drops below 35 psi for any reason, all actuator units trip to the brake-engaged position. This way, if the air supply is disrupted due to damage or malfunction, the brakes go to the safest condition.

Preferably, an analogous brake actuator system may be used according to the invention for an air parking brake system for the trailer of a tractor-trailer vehicle, or for air parking brakes in any vehicle or equipment. In such a system, a actuator unit, such as described above, is installed as preferably the sole blocking and vent valve in the trailer parking brake air line. The actuator unit is electronically connected to the tractor (truck) ignition switch, so that the trailer parking brake engaged and is locked in the engaged condition when the tractor engine is turned off. Also, the actuator unit is electronically connected to a second manual rocker switch in the tractor cab that allows the driver to manually set the trailer parking brake to a "park" position and to manually release the trailer parking brake to a "drive" position either after he/she has set the brake or after the automatic actuator system has tripped the brake into engagement. Optionally, the trailer parking brake actuator system may include circuits and computer programming that operatively connect its actuator unit to other stations on the trailer or even on the tractor. For example, a circuit may be included that is broken if the back door of a cargo van is left open, so that the parking brake is locked on whenever the van door is open, and the driver cannot drive away without closing the door. Preferably, the rocker switch for the trailer actuator unit is separate but side-by-side on the dash board with the tractor parking brake rocker switch.

Solid-state embodiments of the invented actuator system may be particularly advantageous, in that they may include many safety features and many data ports for various stations. An example of a solid-state brake actuator system includes a solenoid valve, a solid-state controller board, and an operator control switch for being mounted in a chosen convenient position. These three main components are operative and electrically/electronically connected to perform the required and desired methods of actuating the air-spring parking brake. Preferably, the invented actuator system is compliant with all required Federal Motor Vehicle Safety Standards and compatible with the ABS systems, which are being required on modem vehicles. One solid-state embodiment is described below:

Example of a Solid-State Embodiment

Given the description contained herein, one skilled in the art may see how a solenoid valve unit 160 with a solid-state computer 162 may be installed in the place of unit 102 in FIGS. 8 and 9, and how a solid-state embodiment may provide the efficient, reliable safety features described above. The computer 162 is programmed to receive and process the signals coming to it from the various stations, and to actuate the solenoid valve and vent appropriately. Preferably, as with the previously-described embodiments, the solid-state embodiment is adapted to cut and vent air to the parking brakes when one or more circuits including the various stations are opened. The computer 162 is operatively and, optionally also physically, attached to the solenoid unit. The computer 162, solenoid 160, and operator switch 163 may be separate structures electrically/electronically connected. The computer 162 may be circuit board/microprocessor chip(s) that may be designed according to conventional technology once the invented apparatus and method described herein are understood. Preferably, the operator switch includes indicator lights and labels for each station, indicating which station is causing the engagement of the brakes. For example, a row of lights may be labeled "Door," "Lift," "PTO/Aux," "Spare," etc, and may be positioned near the "activate/deactivate" switch, which is discussed below.

Figure 12A:
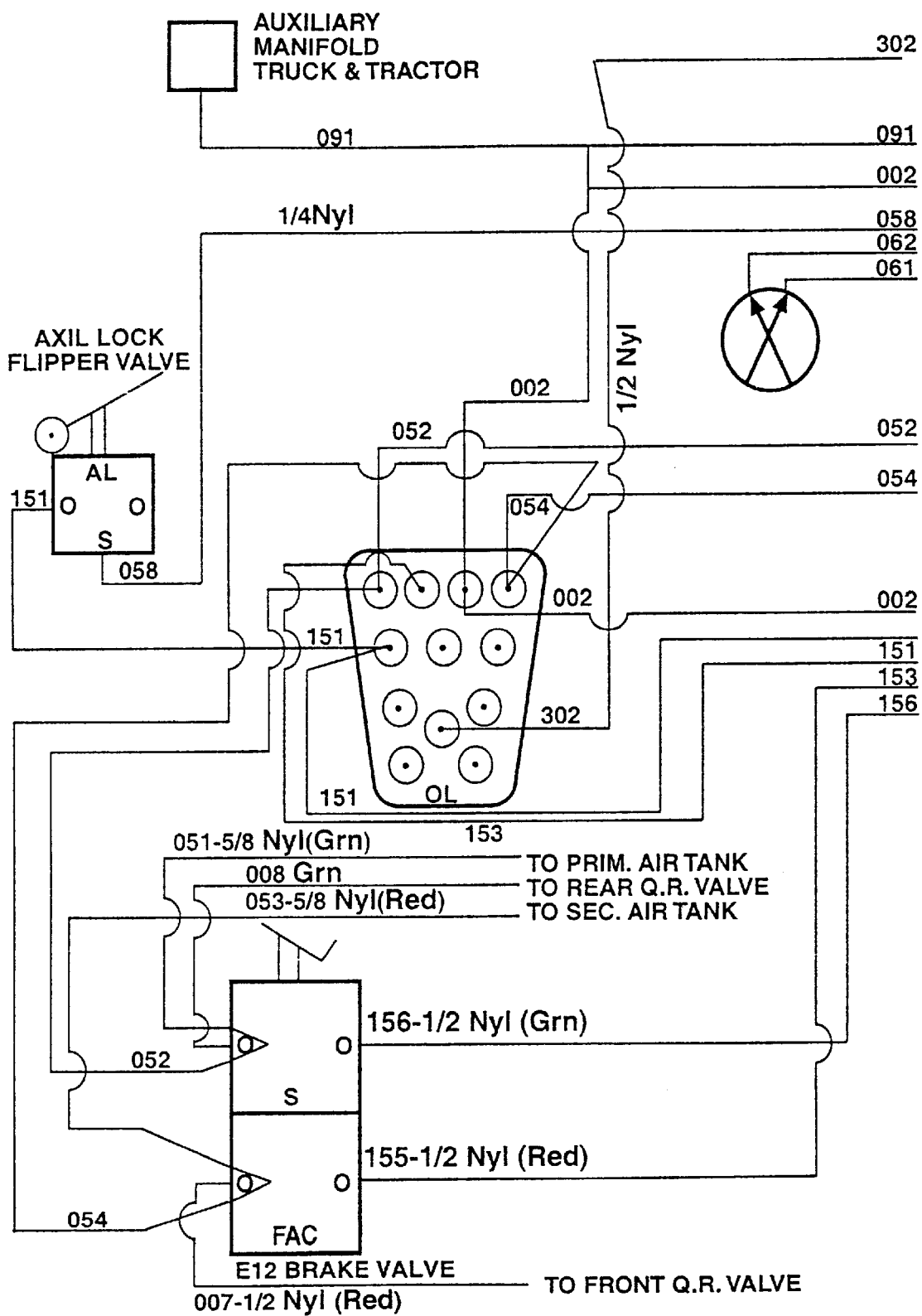

FIGS. 12A and B are two halves of an installation diagram for one embodiment of an especially-preferred, solid-state embodiment of the invention, which combines the functions of the relay and timer and other desired safety features discussed elsewhere in this Description.

Features that are preferably included in the solid-state embodiment include the following:

Solenoid Operation

1. The solenoid employed in this design holds the vehicle air-disengaged/spring-engaged parking brakes in the actuated (applied position) whenever it is not energized, where energized means that current is not passing through the solenoid coil from the control unit.
2. The air brakes are held in the actuated position until such time as the vehicle's ignition key is in the "normal operate" position, whether just placed to this postion or after the engine is started, and the invented brake actuator unit has been activated by momentarily placing its "activate/deactivate" switch (on the dashboard or other driver-convenient location) in the "activate" position.
3. When power is first applied to the control circuit by the ignition key, the circuit is designed such as to automatically maintain the brakes in the actuated position, which is indicated by the turning on a red indicator light 171 to that effect.
4. Momentarily placing the "activate/deactivate" switch 163 in the activate position causes the electronic control circuit to latch DC ground to one side of the air brake control solenoid. The other side of the solenoid is electrically wired to the +12 DC side of the vehicle's electrical system.
5. This energizes the solenoid and releases the brakes from the actuated position. This action is indicated by the control unit turning the red indicator light off and turning a green indicator light 173 on, This latching action of the control solenoid in the energized state, releases the vehicle brakes for normal usage.
6. As long as the solenoid remains latched, the vehicle brakes will remain in their normal operating state. This condition will remain this way until the control unit is electronically or manually reset (de-energized) in one of the following manners:
    a. Manually placing the "activate/deactivate" switch into the "deactivate" position; in this case, deactivation takes place nearly instantly. This places +12 v on a control unit connector input pin that instantly resets the control circuit and de-energizes the solenoid. This function is not over-ridden by the speedometer input function; it is active whether or not the vehicle is stopped or in motion.

b. If the low air pressure switch, which is held open during normal operation air pressure range, closes and places DC ground on its connector input pin to the control unit; this control input is only active when the vehicle is not in motion.

c. If a door switch, that has its contacts normally open, closes and connects +12 V.C. to its connector input pin, into the control unit: this control input is only active when the vehicle is not in motion.

d. If the "PTO/aux." (power take off/auxiliary) switch, that has normally open contacts, closes and connects DC ground to its input pin into the control unit; this control input in only active when the vehicle is not in motion.

e. In the case of operations 2 through above, the circuit is designed so that closure of any of these switches must remain in effect for approximately ½ second to validate their operation and restore the brakes into the actuated state.

Moving Vehicle Over-Ride Function

The electronic control circuit of the invented brake actuator unit is designed to connect parallel to specific types of transmission magnetic pulse generators that drive the vehicle's electrically operated speedometer. The circuit of the electrical control unit senses the output of the transmission pulse generator when the vehicle is in motion and at a speed of approximately 3 miles per hour, or, more preferably about 1–2 miles per hour, without causing error in the vehicle speedometer. Preferably, this vehicle-motion monitoring system is designed to sense the rotational speed of the drive shaft coming out of the transmission, and any rotation greater than or equal to 50 rpm overrides the engagement of the brakes except as noted below.

The circuit develops a control signal that over rides all of the previously noted "de-activate" input lines to prevent the brakes from being actuated up once the vehicle is moving, with the exception of the main "activate/deactivate" switch. This switch is not over-ridden so that it can be used in an emergency situation.

Physical Size

Tentative size of solenoid, operator switch, and solid-state controller, each: 5"×5".

ABS Compatibility

The solid-state actuator system includes a two-way check valve (see FIG. 12) between the air supply and the solenoid valve, for compliance with ABS requirements resulting from the use of a primary air source and a secondary air source.

Control Unit Connections

1. Connections to and from the control unit electronics assembly are to be made via D-Sub connectors with pin and socket connectors, and having back shells. Those connectors will allow for installation of screws and locknuts once they are mated.
2. Basically, the control input lines are to be contained on one connector, while the other connector serves for the output lines to various LED lamps and for the +12 v DC and ground connections to power the electronics.
3. Provisions have been made on the "input" side connector for a source 12 v battery and ground, so if at sometime an input interface requires power, it will be available.
4. These two connectors will be of different genders so as to provide protection from unintentional mix up during installation.

Auxiliary Input and Output Lines

1. The unit will be designed to accommodate as many additional lines as is practical with regards to its impact on printed circuit size and cost. The present schematic indicates 3 spare positively activated inputs and 4 negatively activated inputs.
2. Auxiliary input lines will only be provided that will respond to inputs that are either switched to ground or to +12 v of the vehicle electrical system.
3. If some type of vehicle sensor is employed that does not provide switching to either ground or +12 v of the vehicle electrical system, the conversion to this type switching will have to take place exterior to the designed control circuit, ie. we add a switch.

Operating Voltage and Current Handling Limitations

1. The control electronics are expected to function between a nominal 12.0 vDC source to a maximum of 13.3 vDC, negative ground. The circuit shall be designed to provide a continuous ground source supply current, not to exceed 1 amp at 13.8 vDC total load, with a control solenoid valve of not less that 18.0 ohms coil resistance and all other indicator lamp loads in the ON state.
2. "Ground source" specifically means that the controller will switch the ground side of the 12 vDC vehicle supply to a load whose other lead in connected to +12 vDC, thus copleting the circuit.

Transient Protection

1. Transient protection on the electronic circuit board from vehicular generated sources shall be limited to the use of SMBJ15CADICT (or the equivalent) bi-directional transient voltage suppressors, rated at 15 v and 500 W. These shall be located at:
   a. Electronically between the +12 v battery input connection to the 12 v battery ground input connection;
   b. Each input line that is subject to being switched to and external point on the +12 v side of the vehicle electrical system.
2. Flyback voltage transient protection for the control circuits generated from the collapsing field of the actuator unit solenoid shall consist of a single high voltage diode placed reverse polarity across the feed end and the +12 vDC end connections for the solenoid coil on the circuit board.

Battery Connection Reversal Protection

A 3 amp 200 v diode will be provided in series with the main +12 v battery connections to the unit.

Internal and External Fusing

Operating instructions for the unit will require the use of an external fuse of a maximum amperage rating of 2 amps at 32 volts DC. Internal to the unit, and connected in series with the drain of the pass element transistor, shall be another fuse, rated at 3 amps at 32 volts D.C..

Operating Temperature Range

The desired operating temperature window of the electronics control circuit board is from approximately 32 degrees Fahrenheit to approximately 125 degrees Fahrenheit.

Schematic of Solid-State Embodiment Logic

Figure 13:
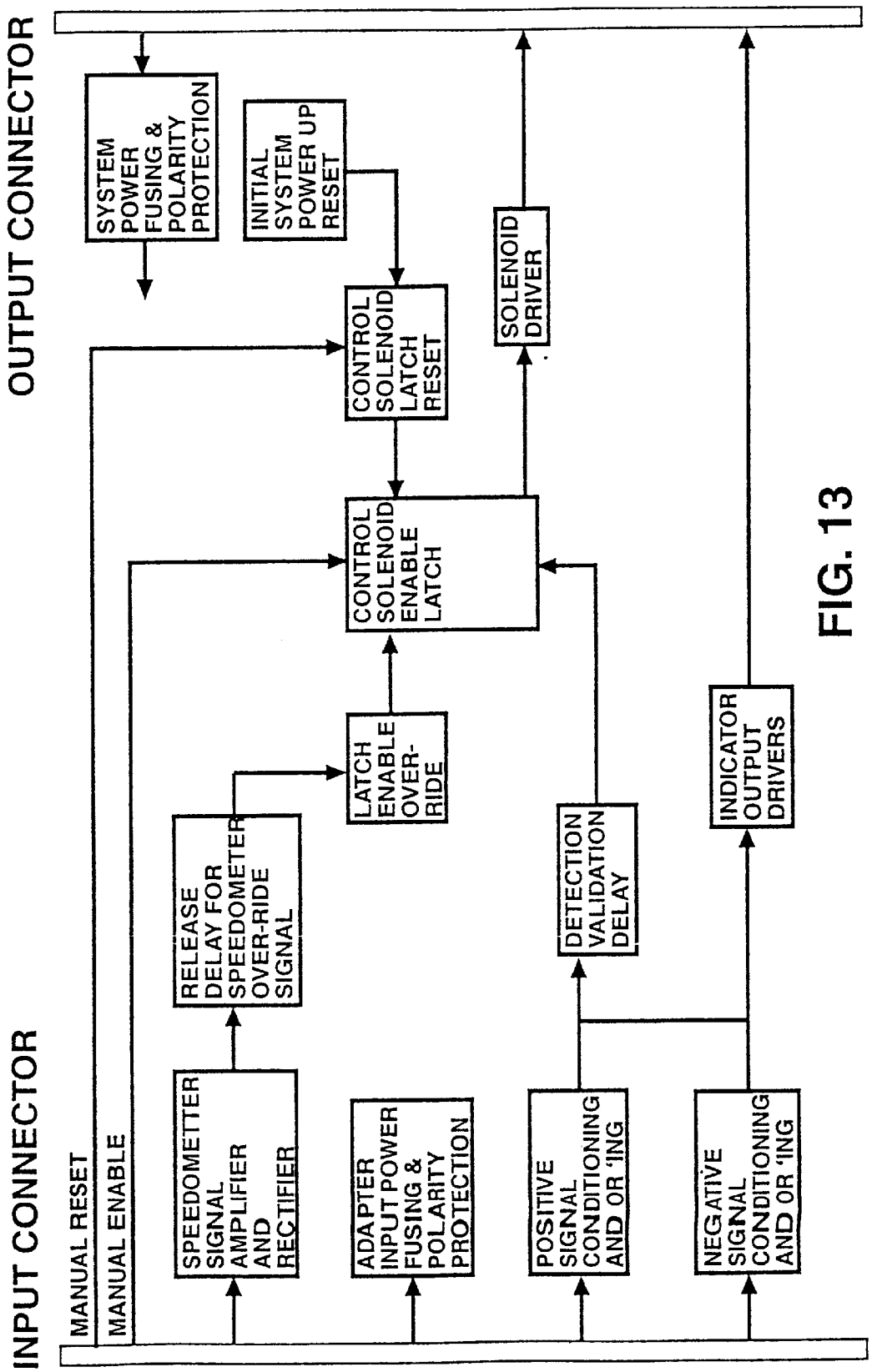
FIG. 13 is a logic diagram for one embodiment of the solid-state embodiment of the invention.

The logic of one solid-state embodiment is portrayed in FIG. 13. Optionally, other configurations may be used, but this embodiment has been found to be efficient and compatible with conventional vehicle systems. The computer preferably has burned-in memory so that, when the vehicle engine is off and, therefore, the ignition system does not provide power to the invented unit, battery power is not needed to maintain the memory in the computer and the brake actuator system does not drain the vehicle's battery.

Although this invention has been described above with reference to particular means, materials and embodiments, it is to be understood that the invention is not limited to these disclosed particulars, but extends instead to all equivalents within the scope of the following claims.

What is claimed is:

1. A safety system for applying an air parking brake on a vehicle, the system comprising:
    a solenoid valve in an air line supplying air to a parking brake, the solenoid valve being upstream of the parking brake, the solenoid valve comprising a blocking valve positioned to block the air line and a vent positioned to vent air pressure from the air line downstream of the solenoid valve;
    a controller operatively linked to the solenoid valve, the controller comprising a plurality of station circuits, each station circuit including a switch that is opened when a condition exists in which vehicle movement would be dangerous, and in which the controller actuates the solenoid valve to block the air line and vent the air line when any one of the switches is opened.

2. A safety system as in claim 1, wherein one of said plurality of station circuits includes a vehicle ignition switch.

3. A safety system as in claim 1, wherein one of said plurality of station circuits includes a vehicle door switch that is open when the door is open and closed when the door is closed.

4. A safety system as in claim 1, wherein one of said plurality of station circuits includes a switch positioned at or near a wheelchair lift on the vehicle.

5. A safety system as in claim 1, wherein the controller comprises a vehicle motion override, wherein the controller will not apply the parking brake if the vehicle is in motion.

6. A safety system as in claim 1, further comprising a loading valve and an air pressure supply, wherein the solenoid valve is between the loading valve and the air pressure supply.

7. A safety system as in claim 1, further comprising a loading valve and an air pressure supply, wherein the solenoid valve is between the loading valve and the air brake.

8. A safety system as in claim 1 further comprising an air pressure supply, wherein the solenoid valve is between the air pressure supply and the air brake, and the system comprises no other valves in the air line between the air pressure supply and the air brake.

9. A safety system as in claim 1 further comprising an air pressure supply, wherein the solenoid valve is between the air pressure supply and the air brake, and the system comprises a two-way check valve between the solenoid valve and the air system.

* * * * *